May 3, 1955   C. J. KOCIAN   2,707,748
STEERING CONTROLLED OSCILLATING LAMP STRUCTURE
Filed April 27, 1954   3 Sheets-Sheet 1

Charles J. Kocian
INVENTOR.

May 3, 1955  C. J. KOCIAN  2,707,748
STEERING CONTROLLED OSCILLATING LAMP STRUCTURE
Filed April 27, 1954  3 Sheets-Sheet 2
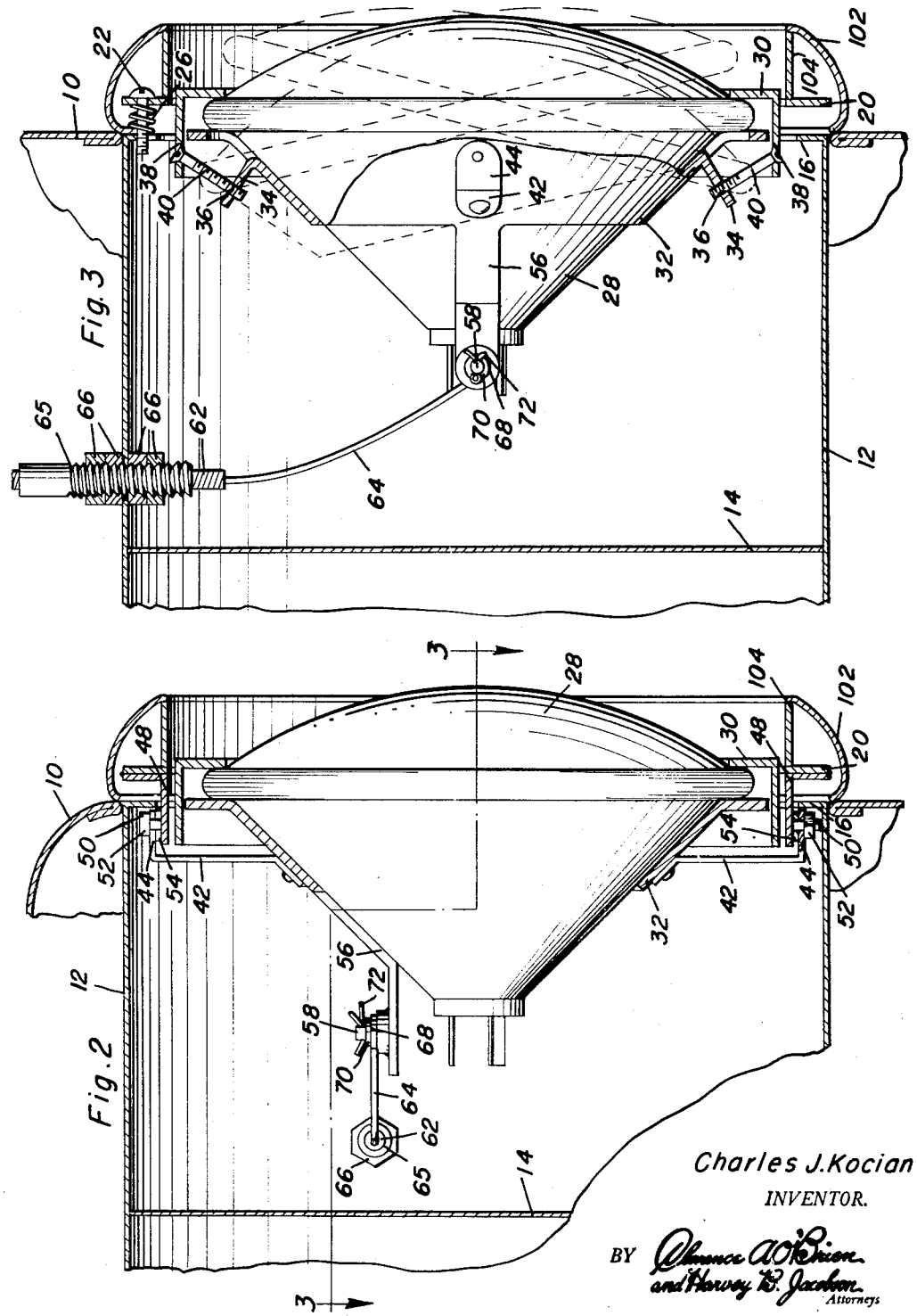
Charles J. Kocian
INVENTOR.

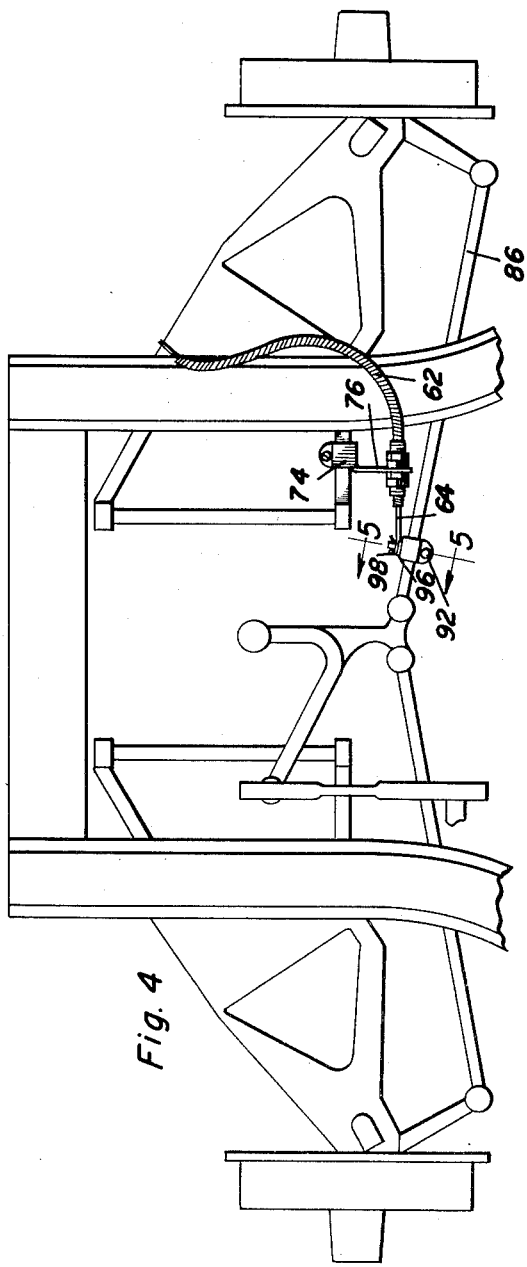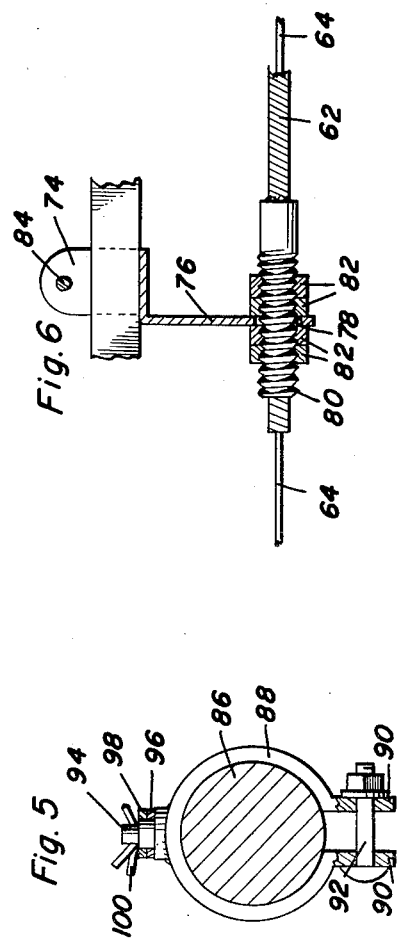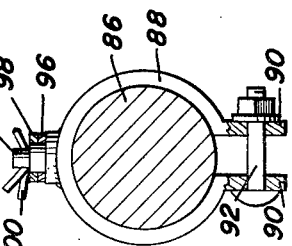
Charles J. Kocian
INVENTOR.

United States Patent Office 2,707,748
Patented May 3, 1955

2,707,748

STEERING CONTROLLED OSCILLATING LAMP STRUCTURE

Charles J. Kocian, Washington, D. C.

Application April 27, 1954, Serial No. 425,786

1 Claim. (Cl. 240—62.7)

This invention relates to automatic steering controlled lights and more particularly to a system whereby the headlights of a vehicle are automatically turned about a vertical axis, corresponding directionally with any change in the angular disposition of the front wheels of an automotive vehicle.

An object of this invention is to provide automatic steering controlled lights for vehicles which can be mounted in the conventional headlight housing of the vehicle.

Another object of this invention is to provide automatic steering controlled lights for vehicles which are controlled by the steering mechanism of the vehicle.

A further object of this invention is to provide automatic steering controlled lights for vehicles having novel means for mounting sealed beam units for movement about a vertical axis.

A yet further object of this invention is to provide automatic steering controlled lights for vehicles which can easily be attached to any conventional vehicle without material changes or alterations therein.

A still further object of this invention is to provide automatic steering controlled lights for vehicles which are simple and efficient in construction, positive in operation, and durable and lasting in use.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a vertical sectional view of the automatic steering controlled light assembly forming the subject of this invention;

Figure 3 is a sectional view taken substantially along the section line 3—3 of Figure 2;

Figure 4 is a top plan view of the steering mechanism of a vehicle showing the control means for the lights secured thereto;

Figure 5 is a sectional view taken substantially along the section line 5—5 of Figure 4; and Figure 6 is a sectional view of the mounting bracket for securing one end of the control means adjacent the steering mechanism.

Figure 1:
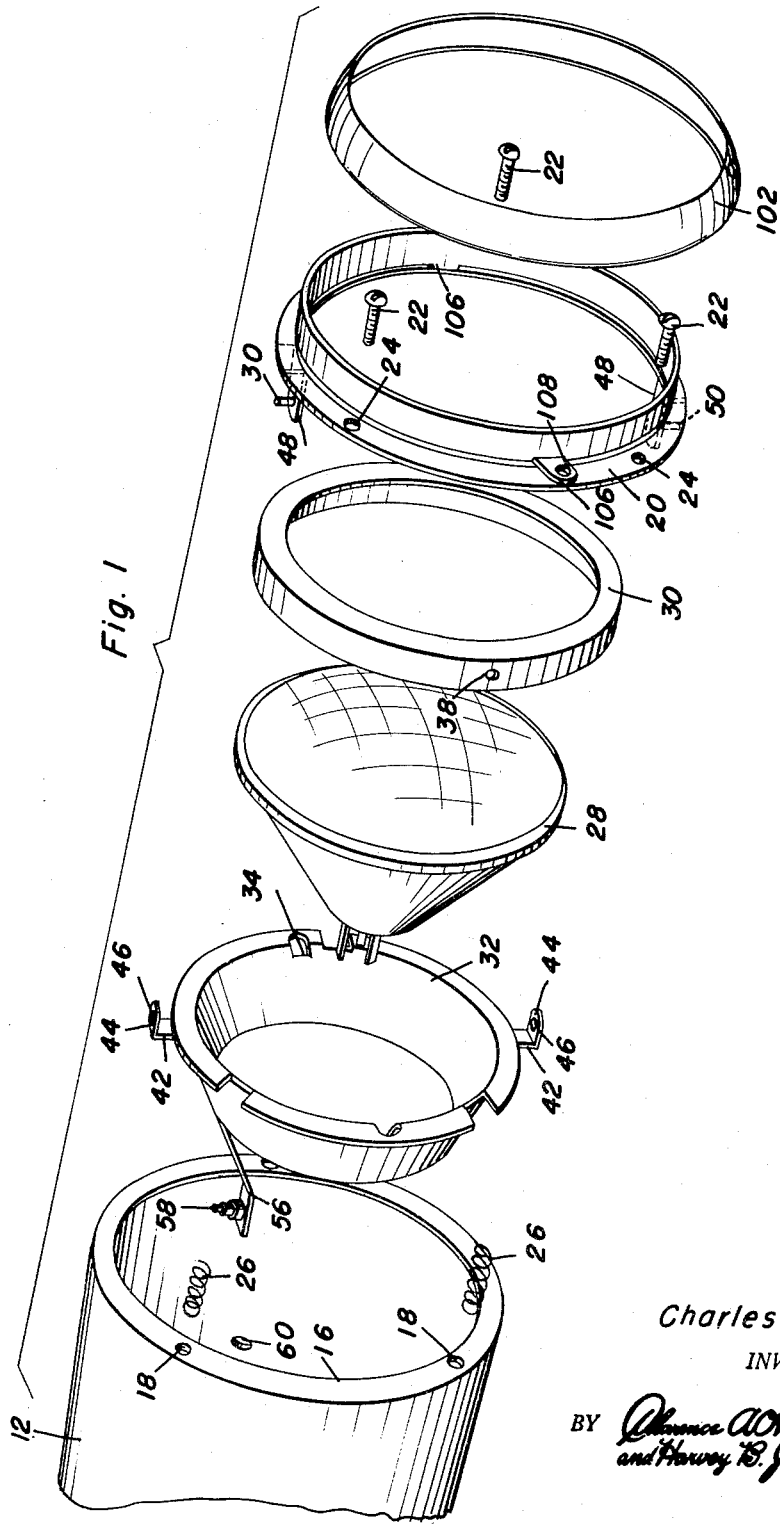
Figure 1 is an exploded perspective view of one of the automatic steering controlled light assemblies.

Referring now more particularly to the accompanying drawings, it will be seen that there is illustrated a portion of the front fender 10 of a vehicle having a headlight housing 12 mounted therein. The headlight housing 12 is closed at its rear by a wall 14 and is open at its front end and is provided with an inwardly extending flange 16. The flange 16 is provided with a plurality of circumferentially spaced apertures 18 extending therethrough. These apertures 18 are internally threaded for a purpose to be later described.

A supporting or mounting ring 20 is adapted to be secured by means of fasteners 22 passing through apertures 24 therein and into the internally threaded apertures 18 of the flange 16. Coil springs 26 are adapted to be positioned between the mounting ring 20 and the flange 16 for urging the ring 20 into engagement with the heads of the fasteners 22. This structure is conventional on present day vehicles and serves to adjust the angle of the headlamps.

A sealed beam lamp 28 is adapted to be mounted within the ring 20. A front retainer ring 30 engages the front face of the lamp 28 and is provided with a side wall portion extending rearwardly of the lamp and parallel to the longitudinal axis of the lamp. A substantially frusto-conical lamp carrier 32 is provided for insertion within the ring 30 from the rear of the lamp 28 and the parts 30 and 32 cooperate to retain the lamp 28 therebetween. The ring 32 is provided with a plurality of tabs 34 which are struck therefrom and extend rearwardly therefrom. The tabs 34 are provided with internally threaded apertures 36 extending therethrough. The ring 30 is provided with a plurality of apertures 38 which are in alignment with the apertures 36 in the tabs 34. Suitable threaded fasteners 40 extend through the apertures 38 and have their inner ends received in the apertures 36 clamping the lamp 28 between the parts 30, 32.

Secured to the ring 32 at diametrically opposite points are a pair of brackets 42. The brackets 42 extend from the ring 32 in a vertical direction and are provided with horizontally extending portions 44 at their free ends. The horizontally extending portions 44 are provided with apertures 46 extending therethrough and which are in alignment with each other. The ring 20 is provided with a pair of rearwardly extending brackets 48 at diametrically opposite points. The brackets 48 are positioned at the uppermost and lowermost points on the ring 20. Extending radially outwardly from each of the projections 48 is a pin 50. The pins 50 are adapted to be received within the apertures 46 whereby the rings 30 and 32 will be pivotally mounted to the housing 12 of the vehicle. The pins 50 may be externally threaded to receive thereon nuts 52. Further, suitable washers 54 may be disposed between the brackets 48 and portions 44 of brackets 42.

The ring 32 is further provided with an arm 56 extending rearwardly therefrom. The arm 56 is provided with a pin 58 extending upwardly therefrom adjacent the rear thereof. The housing 12 is provided with an aperture 60 in one side thereof which receives one end of a flexible housing 62 having a flexible cable 64 extending therethrough. The housing 62 is provided with an externally threaded sleeve 65 secured adjacent the one end thereof. The sleeve 65 is received in the aperture 60 and suitable lock nuts 66 are engaged on the sleeve 65 on opposite sides of the housing wall. The cable 64 is provided with an enlarged head portion 68 having an aperture extending therethrough for receiving the pin 58. A suitable washer 70 is disposed on the projection 58 above the enlarged head 68 and a cotter pin 72 extends through the pin 58 for retaining the washer 70 and enlarged head 68 in position thereon. Thus, it will be seen that movement of the cable 64 will cause the rings 30 and 32 to pivot on the pins 50.

As seen in Figures 4 through 6, the other end of the housing 62 is adapted to be mounted adjacent the steering mechanism of the vehicle. A bracket 74 is secured to the usual lower control arm or wishbone of the front wheel suspension of the vehicle. The bracket 74 has an arm 76 extending therefrom and which arm is provided with an aperture 78 extending through the free end thereof. The housing 62 is provided with an externally threaded fitting 80 secured thereto adjacent the end thereof which member 80 is received within the aperture 78. Suitable nuts 82 are threaded on the member 80 from opposite ends and engage the arm 76 for locking the end of the housing 62 in fixed position. The bracket 74 comprises a U-shaped member having a pair of free parallel ears having a fastener 84 extending therebetween for urging the ears together to frictionally engage the aforementioned control arm or "wishbone" of the vehicle. Secured to a tie rod 86 of the vehicle is a split ring clamp 88 having ears 90 extending from the free ends thereof. A suitable fastener 92 extends through the ears 90 for urging the same together to frictionally engage the tie rod 86. The clamp 88 is provided with a projection 94 extending from one side thereof and the cable 64 is provided with an enlarged head 96 having a recess therein which receives the projection 94. A suitable washer 98 is disposed on the projection 94 above the enlarged head 96 and a cotter-pin 100 extends through the projection 94 above the washer 98. Thus, it will be seen that the other end of the cable 64 is pivotally connected to the tie rod of the vehicle.

In practical use of the device thus far described, operation of the vehicle steering mechanism will cause the tie rod 86 to shift either to the left or right. Movement of the tie rod 86 will cause the cable 64 to move within the housing and to move the arm 56 which is secured to the ring 32. This will cause the ring 32 to pivot about the pins 50 and cause the headlight to shine in the direction in which the wheels of the vehicle are turned.

A dress ring 102 is mounted on the fender 10 in a conventional manner. In some instances it will be desirous to provide an internal dress ring for the portion of the housing between the outer edge of the dress ring 102 and the ring 20. This internal dress ring will be in the form of a longitudinally extending circular ring 104 having a plurality of tabs 106 extending radially outwardly therefrom at the inner end of the ring. The tabs 106 are provided with apertures 108 which receive suitable fasteners for securing the tabs to the ring 20.

Obviously, it is intended that both lamps of the vehicle be turned in unison, which may be achieved either by duplicating the actuating cable arrangement to extend from the steering mechanism to both lamps, or using only one cable as shown and providing a suitable tie-rod or cable connection from one lamp to the other.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

In a vehicle, the combination of a lamp housing provided at its front with a circular opening, a supporting ring adjustably mounted in said opening and having front and rear faces, upper and lower angle brackets secured to the rear face of said ring and projecting rearwardly into said housing, a substantially frusto-conical lamp carrier disposed in the housing, upper and lower angle brackets secured to the outer surface of said carrier, vertical pivot pins connecting said last mentioned brackets to the respective brackets on said supporting ring, whereby said carrier is swingable horizontally in said housing, an outturned annular flange provided at the front edge of said carrier, a sealed beam lamp seated in said carrier, an annular retainer removably positioned on the carrier and including an annular side wall and an inturned rim at the front edge of said side wall, said rim being spaced forwardly from the flange of said carrier, said sealed beam lamp having an edge portion thereof disposed between said flange and said rim, the side wall of said retainer extending rearwardly beyond said flange, apertured lugs struck outwardly from said carrier, screws extending through the side wall of said retainer and through the apertures in said lugs, whereby to clamp the edge portion of said lamp between said rim and said flange, a dressing ring removably secured to said housing concentrically with said supporting ring, and means responsive to the vehicle steering mechanism for swinging said lamp carrier.

References Cited in the file of this patent

UNITED STATES PATENTS

| | | |
|---|---|---|
| 859,090 | Maisongrande | July 2, 1907 |
| 1,421,775 | Harrington | July 4, 1922 |
| 1,991,101 | Kennelly | Feb. 12, 1935 |
| 2,460,585 | Kennelly | Feb. 1, 1949 |
| 2,606,999 | Tostevin | Aug. 12, 1952 |